Feb. 4, 1969
E. S. GORDON ET AL
3,425,415
CONTROLLED INFUSION SYSTEM
Filed May 2, 1966
Sheet 1 of 2
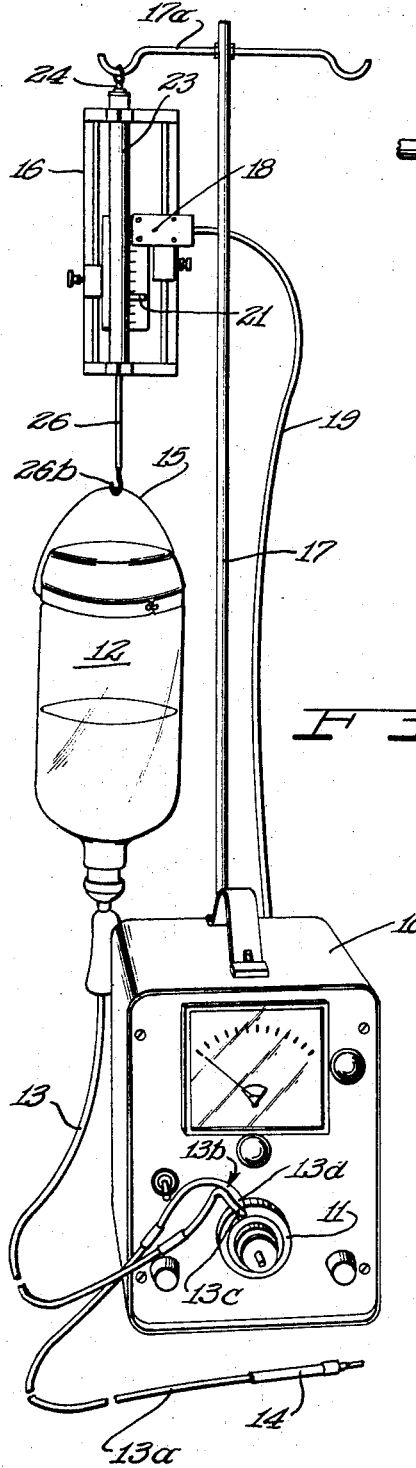
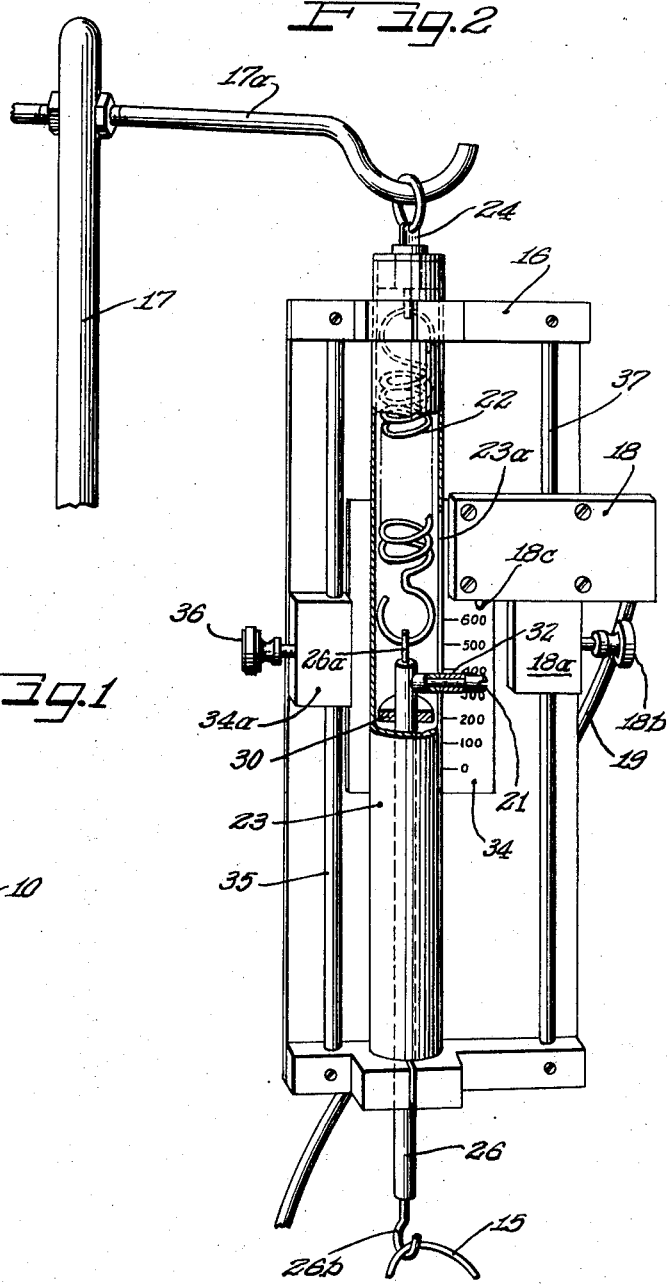
INVENTORS
Ernest S. Gordon
Ronald B. Schwab
Leander O. Thunberg
BY Hill, Sherman, Meroni, Gross & Simpson
ATTORNEYS

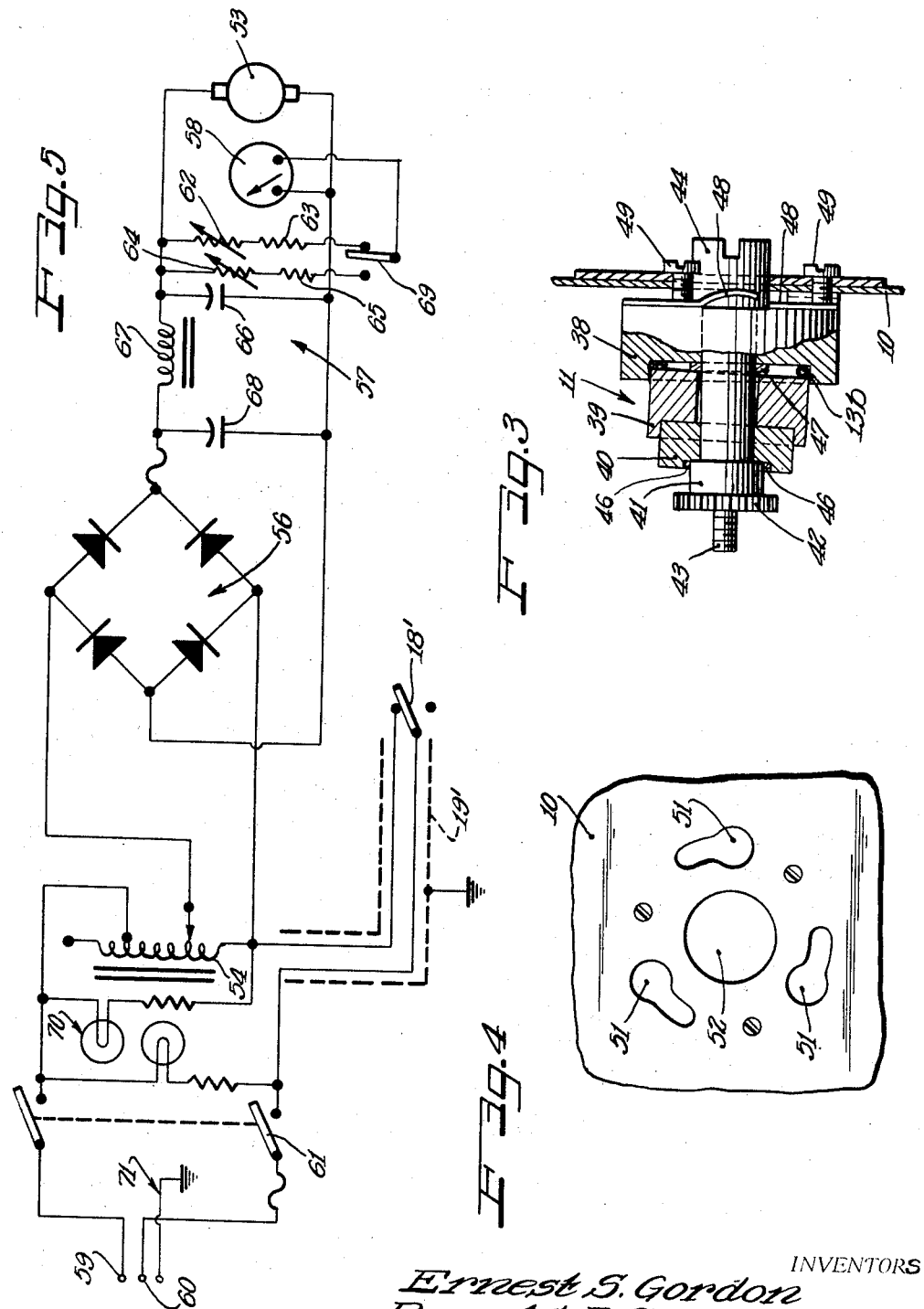

United States Patent Office 3,425,415
Patented Feb. 4, 1969

3,425,415
CONTROLLED INFUSION SYSTEM
Ernest S. Gordon, Sunnyvale, Calif., and Ronald B. Schwab, Evergreen Park, and Leander O. Thunberg, Riverdale, Ill., assignors to IIT Research Institute, Chicago, Ill., a corporation of Illinois
Filed May 2, 1966, Ser. No. 546,957
U.S. Cl. 128—214        3 Claims
Int. Cl. A61m 5/20; F04b 43/08; B67d 5/08

ABSTRACT OF THE DISCLOSURE

A system for the controlled infusion of liquids into the body by means of a positive pump for accurate flow rates. The device also includes a calibrated cut-off unit to cut off the flow after a pre-determined volume has been pumped through the system.

---

This invention relates to a controlled infusion system, and particularly to a positive displacement pumping arrangement for intravenous or intra-arterial infusion of a liquid.

Intravenous infusion of drugs or nutrients in a fluid form is required for a number of medical purposes. The familiar gravity-fed system employing a small drip chamber monitoring the rate of delivery is fraught with difficulties and inaccuracies (such as non-steady flow rates, human errors in flow setting, etc.). A commercial system involving a positive displacement pump has been developed, but this commercial system is found to have several inadequacies for clinical application: (1) its rate of delivery of fluid to the patient is not calibrated and is not repeatable; (2) it is not practicable to change the range of flow rate over wide limits; and (3) it does not have a calibrated shut-off which discontinues flow after delivery of a programmed dosage to the patient.

A specific embodiment of the present invention has been developed by modifying the above-mentioned commercial system to obviate the aforementioned inadequacies. The present system has been used clinically with impressive success for a substantial period of time. The system has been required to run twenty-four hours a day for periods up to seven weeks on any one patient. The pump was found to maintain an accuracy of flow within five per cent of the total volume. This was important to the nursing staff as it allowed an accurate estimate of fluid spent. There were no occurrences of back flow or air embolism. No repairs or maintenance were required except two replacements of the tubing which were not attributable to the contributions of the present invention. The calibrated flow cut-off unit was found to be convenient and desirable to insure safe cut-off well above the zero level.

It is therefore an important object of the present invention to provide an improved intravenous infusion system.

It is another object of the present invention to provide a fluid delivery system capable of clinical use for intra-arterial infusion.

It is a further object of the present invention to provide an infusion system providing a calibrated and repeatable flow rate.

Still another object of the present invention is to provide an infusion system providing for convenient changing of the range of flow rate over wide limits.

A still further object of the present invention is to provide an infusion system providing for a calibrated shut-off after a programmed dosage.

Another and further object of the present invention is to provide an infusion system capable of maintaining an accuracy of flow within plus or minus ten per cent of total volume and which is particularly reliable and convenient in clinical use.

Other objects, features, and advantages of the present invention will be apparent from the following detailed description of a particular embodiment of the invention taken in connection with the accompanying drawings, in which:

FIG. 1 is a perspective view of an infusion system in accordance with the present invention;

FIG. 2 is an enlarged perspective view showing the calibrated cut-off device of FIG. 1 with certain parts broken away;

FIG. 3 is a side elevational view of the pump for the system of FIG. 1 with certain parts broken away and in section;

FIG. 4 is an enlarged front view of a portion of the front panel of the housing shown in FIG. 1 with the pump removed; and FIG. 5 is a schematic circuit diagram of the control circuit for the pump motor which forms part of the system of FIG. 1.

As shown on the drawings:

Referring to FIG. 1, there is illustrated a control unit housing 10 which includes a positive displacement pump 11. The pump 11 receives fluid from a bottle 12 via a length of flexible tubing 13 and supplies the fluid via a second length of tubing 13a to a needle connector 14. The connector 14 is adapted to receive a needle or similar device which enters the body of the patient for intra-venous or intra-arterial infusion. A section 13b of flexible tubing extends into the interior of the pump 11 at a point indicated at 13c, extends about a loop path within the pump, and exits from the pump at a point indicated at 13d. This arrangement is found in the aforementioned commercially available infusion unit wherein the tubing section 13b is of surgical gum rubber, the sections of tubing indicated at 13 and 13a being of a plastic material known as "Tygon."

The bottle 12 is provided with a wire handle 15 by which it is suspended. A calibrated cut-off device 16 in accordance with the present invention is mounted by means of an upright rod 17 secured to housing 10. More specifically, a hanger arm 17a is secured to the upper end of the rod 17 and in turn supports the calibrated cut-off device 16. The cut-off device 16 has a microswitch 18 of a snap-action type adjustably mounted thereon and connected via a cable 19 to control circuitry within the housing 10. The microswitch 18 is actuated by means of a pin 21. The pin 21 is secured to a rod 26 which in turn is connected to the lower end of a coil spring 22. The pin 21 is movable vertically in an elongated slot 23a in a tubular casing 23 which houses the spring 22. The coil spring 22 may be constructed of piano wire and is supported from above by means of a fitting 24. The pin 21 may be threadably secured to rod 26, and the rod 26 may be provided with an aperture at its upper end 26a through which the lower end of the coil spring 22 extends. The lower end of the rod 26 carries a hook 26b for receiving the handle 15.

In an actual embodiment in accordance with the present invention, a centering washer 30 was provided on the rod 26 as indicated in FIG. 2, and was made of "Teflon" in order to limit the amount of friction for low calibration hysteresis error (rod 26 being of stainless steel). For the same purpose, the tube or casing 23 was provided with a lower end cap having a "Teflon" washer fixed therein for guiding the rod 26. This lower end cap washer had an interior diameter of .190 inch with a tolerance of plus .003 where the rod 26 had an external diameter of 3/16 inch. The centering washer 30 had an external diameter of .520 where the internal diameter of the casing 23 was .527 inch. As indicated in FIG. 2, the centering washer 30 has a 15° chamfer at each axial end thereof.

The actuator pin 21 carries an indicator pointer 32 which cooperates with graduated markings on a volume scale part 34. The part 34 includes a slider block 34a which is vertically slidable on a support rod 35. A thumb screw 36 is threaded into the block 34a and engageable with the support rod 35 to adjustably fix the position of the volume scale part 34. At the beginning of an infusion operation, the volume scale plate 34 is adjusted so that the indicator 32 is located at zero on the scale. The graduated markings on the scale 34 may read from "0" to "1000" milliliters.

The micro-switch 18 is slidably mounted on a post 37 by means of a slider 18a which is fastened into position by means of a thumb screw 18b. Therefore, the micro-switch 18 can be adjusted upwardly or downwardly until an actuator 18c of the micro-switch 18 is aligned with a given dosage indication on the graduated plate 34. The dosage shown in FIG. 2 is approximately 650 milliliters.

Therefore, as the fluid contained within bottle 12 is pumped therefrom via the tubing 13, the combined weight of the bottle 12, the tubing 13 and the liquid contained within the bottle becomes less due to the absence of pumped liquid. The spring 22 retracts upwardly in response to the decrease in combined weight. The pointer 32 thereby indicates the amount of liquid which has been pumped from the bottle. The spring 22 continues to move upwardly as the fluid is pumped until the pin 21 contacts the actuator 18c of the switch 18 to cause a motor within the casing 10 to be disabled to cease the operation of the pump 11.

The spring 22 in effect weighs the liquid contained in bottle 12 and therefore the graduated markings on the plate 34 actually represent weight rather than volume. However, most of the liquids used as drugs for intravenous and intra-arterial infusion have specific gravities substantially equal to one, and therefore the mass of the liquid is substantially equal to the volume of such a liquid. The typical liquids which may be used include 0.9% saline, 5% dextrose and blood plasma. Each of these liquids have a specific gravity very close to unity. It should be noted that various standard size infusion bottles such as 300, 600 and 1000 ml. can be accommodated without any special adjustments or modifications.

Referring now to FIG. 3, the pump 11 is illustrated with portions thereof broken away to disclose the operation. The pump 11 is a wobble plate pump having a fixed circular plate 38 for receiving a loop of the special flexible tubing 13b, a circular wobble plate 39 loosely fitted about a motor-driven shaft 43 for engaging the loop of tubing at various points, a slip member 40 which engages one end of the wobble plate 39, and a knurled nut 41 having a head portion 42 which is screwed onto the threaded motor-driven shaft 43 and connected to the slip member 40. The shaft 43 is driven by an electric motor which is coupled thereto at one end by means of a coupler 44.

As the motor-driven shaft 43 rotates, the slip member 40 is caused to rotate as the slip member is rigidly connected to the rotatable knurled nut 41. The wobble plate 39, however, does not rotate as it bears against the rigid plate 38 and the tubing 13. This slip member 40 has a sleeve bearing 46 into which the nut 41 is engaged. The slip member 40 is obliquely mounted with respect to the nut 41, so that upon rotation, the slip member 40 causes the wobble plate 39 to wobble; i.e., sequentially compressing the tubing at one point at a time along the loop of tubing, accomplishing complete occlusion at the point of compression. Therefore, the fluid within the loop of tubing is moved along away from the bottle 12 and toward the outlet 14 to accomplish the pumping action without actually touching the liquid. It should be understood that the wobble plate 39 is shown in one of its successive angular orientations in FIG. 3 with an upper point along the loop of tubing 13b being compressed, while the lower points and all other points along the loop within the pump 11 remain unaffected by the wobble plate.

The entire operation of the wobble plate pump is well known in the art and the single modification made to the pump 11 is the addition of a spacer or washer 47, which is a washer-like member having a hole therein for mounting on the shaft 43. The spacer 47 can be constructed of aluminum, stainless steel, or brass. This spacer 47 separates the wobble plate 39 and the fixed plate 38 so that a constant distance is maintained therebetween each time the tubing 13b is inserted into the pump 11. The tubing 13b is inserted into the pump 11 by loosening the knurled nut 42 so that the wobble plate 39 can be moved to the left to accommodate a loop of the tubing 13b which is placed around the shaft 43 and rests against the fixed plate 38. The wobble plate 39 is then placed into position against the tubing 13b and the knurled nut 42 is then tightened, causing the wobble plate 39 to constrict the tubing 13b as shown in FIG. 3. The spacer 47 causes the wobble plate 39 to maintain a certain distance equal to the width of the spacer 47 from the fixed plate 38. As a result, the distance between the wobble plate 39 and the fixed plate 38 is not dependent upon the amount of force exerted on the knurled nut 42 in tightening the wobble plate 39 into position. Instead, a fixed distance is achieved and maintained each time an intravenous unit is attached to the pump 11. The tubing 13b is compressed the same amount regardless of changing of the pump or the intravenous unit. Therefore, a voltmeter can be accurately calibrated to reflect the flow rate.

The width of the spacer 47 is selected for a particular tubing, as there are two standard sizes of rubber tubing with ID's of $\frac{1}{16}$ and $\frac{1}{8}$ inches, respectively. Each has its own pump and also a corresponding spacer. A larger diameter of tubing permits a greater rate of liquid flow. A set of springs 48 is used to create a firm support for the pump 11 against the wall of the housing 10. Three mounting screws 49 are used to secure the pump 11 to the housing 10.

The control unit 10, which includes the pump 11 and the direct current electric motor and associated control circuitry therefor, without the inventive modifications as herein described, can be obtained from Sigmamotor, Inc., of Middleport, N.Y. Two types of Sigmamotor units were modified in accordance with principles of the present invention for two separate types of tubing and associated flow rates. These two types of units are manufactured by Sigmamotor, Inc., under the following model number and description:

| Model No. | Description |
| --- | --- |
| AL–2–E | Infusion pump for $\frac{1}{16}''$ I.D. tubing with electronic variable speed control flow rated 0.025 to 2.0 ml./min. |
| AL–4–E | Infusion pump for $\frac{1}{8}''$ I.D. tubing with electronic variable speed control, flow rated 0.17 to 15 ml./min. |

The spacer 47 for the unit AL–2–E has a diameter equal to 0.625" and an inside diameter of 0.2656" with a thickness of 0.068". The annular spacer 47 for the model AL–4–E has an outside diameter of 0.625" and an inside diameter of 0.2656" with a thickness of 0.109". A chamfered or beveled edge is provided for each spacer at the inner periphery on one side of the spacer facing the motor, to conform to a corresponding bevel on the driving shaft at a point where the threading commences.

Referring now to FIG. 4, an enlarged view of a portion of housing 10 without the pump 11 is illustrated. The housing 10 is provided with three keyhole shaped apertures 51 for receiving the mounting screws 49 connected to the pump 11. These apertures 51 enable the pump 11 to be easily removed and replaced with another pump for accommodating different size tubing for greater or less flow rate. The mounting screws 49 enter at the larger section of the keyhole-shaped apertures and the pump is then rotated counterclockwise, thereby placing it in its final disposition. An aperture 52 is provided to enable the shaft coupler 44 to enter the housing 10 for coupling with an electric motor.

Referring now to FIG. 5, a schematic circuit diagram of the control circuitry for an electrical motor 53 to drive the shaft 43 is illustrated. The control circuitry consists essentially of a line-operated auto-transformer 54, a full-wave bridge rectifier 56 for converting alternating line current to direct current and an L–C filter 57 for providing a substantially ripple-free direct current and a milliammeter 58 with its associated resistor circuit to form a voltmeter. The alternating-current line voltage is connected to terminals 59, 60 and coupled to the controlled circuitry via ON–OFF switch 61. The operation of this control circuitry for the motor 53 is basically well known to one skilled in the art. However, certain modifications of the basic circuitry in accordance with principles of the present invention will now be described.

The micro-switch 18 is represented schematically by a switch 18′ which is coupled via the cable 19, which is represented schematically by a shielded cable 19′, to the auto transformer 54. The switch 18′ is normally closed and therefore completes the circuit from the input terminal 60 to the auto transformer 54. (A grounded plug and conductor 71 were added for safety.) However, when the pin 21 contacts the actuator 18c, as shown in FIG. 2, the switch 18′ moves downwardly to an open position, thereby removing the source of power from the auto transformer 54, the operating pilot lamp 70 which was added and the other control circuitry to disable the electric motor 53.

The other modifications added to the basic control circuitry are the two sets of limiting resistors for the milliammeter 58, and a range selector switch 69. Variable resistor 62 and resistor 63 form one balancing circuit; and variable resistor 64 and resistor 65 form the other limiting circuit. Each limiting circuit calibrates the milliammeter 58 so that readings can be taken directly in milliliters per minute for a given pump. For example, two such calibrations can be adjusted for a range of flow from 0 to 1.20 ml. per minute and 0 to 12.0 ml. These adjustments are made by varying the variable resistors 62 and, alternatively, 64 as a factory adjustment for two separate pumps and the corresponding spacer by operating the motor 53 at top speed and thence adjusting each variable resistor to provide a full scale reading on the milliammeter 58. A selector switch 69 is provided for manually selecting a particular range in accordance with a selected pump and intravenous unit for operating each pump. A capacitor 68 was added at the output of the bridge rectifier 56 to boost the maximum D.C. voltage by approximately 10% for calibration purposes.

The values of circuit components for the control circuitry are listed as follows:

| | |
|---|---|
| 62 | 100K |
| 63 | 100K |
| 64 | 100K |
| 65 | 100K |
| 66 | mf 120 |
| 67 | h 0.035 |
| 68 | mf 120 |

It is apparent from the foregoing that we have provided an improved pumping arrangement which provides substantially constant pumping rates for different size pumps which can be easily changed to accommodate different size intravenous units. Furthermore, we have also provided a calibrated cut-off safety unit which disables the pump after a predetermined amount of fluid has been pumped from the intravenous unit in accordance with principles of the present invention.

It will be apparent that many modifications and variations may be effected without departing from the scope of the novel concepts of the present invention.

By way of example, (1) the spacer 47 may be integral with fixed member 38; or (2) the shoulder on shaft 43 which limits tightening movement of the nut 41 onto shaft 43 may be precisely located to provide the same effect as the washer 47. In the second case, by firmly seating nut 41 against the limiting shoulder of shaft 43 each time a new length of tubing is inserted, the degree of compression of the tubing will always be essentially the same, and reliably repeatable flow rates will be achieved.

We claim as our invention:

1. An infusion apparatus for infusion of a liquid which is to be initially stored in a container comprising:
   a container,
   means for supplying liquid from said containers,
   pumping means for pumping the liquid along said supplying means at a substantially constant rate of flow for infusion purposes,
   calibrated cut-off means including weighing means and cooperating switch means for disabling said pumping means in response to a preselected weight of liquid being pumped from said container,
   said weighing means including a spring fixedly supported from above at one end thereof and connected at the opposite end to said container, said weighing means further including a pointer mounted at said opposite end of said spring and an adjustable plate having an adjustable scale for designating the relative displacement of said pointer from a preselected starting position, said switch means comprising an electrical switch adjustably mounted for aligning with said preselected weight of said container and liquid so that said pointer moves upwardly in response to said spring retracting from said starting position as said liquid is pumped from the container to thereby decrease the weight of the container and liquid until said pointer contacts said switch to transmit a stop signal to said dumping means.

2. An infusion apparatus as claimed in claim 1 wherein the container includes tubing for transmitting said liquid, and
   said pumping means includes a fixed member for supporting said tubing, wobble plate means for moving against said tubing to provide complete occlusion of said tubing at the point of contact and for thence moving in a wobble manner to force said liquid along said tubing, and a spacer interposed between said fixed member and said wobble plate means for maintaining a given distance therebetween for a given tubing.

3. An infusion apparatus as claimed in claim 1 further including range indicating means responsive to said pumping means for indicating a preselected one of a plurality of ranges of rates of flow of the liquid.

References Cited

UNITED STATES PATENTS

| | | | |
|---|---|---|---|
| 2,483,924 | 10/1949 | Moulinier | 128—214 X |
| 2,706,755 | 4/1955 | Krasno | 200—85 |
| 2,915,983 | 12/1959 | Berrian | 103—149 |
| 2,952,209 | 9/1960 | Scholin | 137—394 X |
| 2,958,294 | 11/1960 | Johnson | 103—149 |
| 3,105,490 | 10/1963 | Schoenfeld | 222—25 |
| 3,137,242 | 6/1964 | Hahn | 103—152 |
| 3,287,721 | 11/1966 | Baehr | 340—272 |

FOREIGN PATENTS 84,876 12/1958 Denmark.

DALTON L. TRULUCK, *Primary Examiner.*

U.S. Cl. X.R.

103—149; 222—41, 58; 340—272